(12) United States Patent
Moyer (10) Patent No.: US 8,060,724 B2
(45) Date of Patent: Nov. 15, 2011

(54) PROVISION OF EXTENDED ADDRESSING MODES IN A SINGLE INSTRUCTION MULTIPLE DATA (SIMD) DATA PROCESSOR

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 568 days.

(21) Appl. No.: 12/192,513

(22) Filed: Aug. 15, 2008

(65) Prior Publication Data

US 2010/0042808 A1 Feb. 18, 2010

(51) Int. Cl.
*G06F 12/00* (2006.01)

(52) U.S. Cl. .......... 711/214; 711/154; 711/E12.001; 712/22

(58) Field of Classification Search .......... 711/214, 711/154, E12.001; 712/22
See application file for complete search history.

(56) References Cited

U.S. PATENT DOCUMENTS

| | | |
|---|---|---|
| 4,760,545 A | 7/1988 | Inagami et al. |
| 4,825,361 A | 4/1989 | Omoda et al. |
| 6,052,766 A | 4/2000 | Betker et al. |
| 6,877,084 B1 | 4/2005 | Christie |
| 6,898,691 B2 | 5/2005 | Blomgren et al. |
| 7,275,148 B2 | 9/2007 | Moyer et al. |
| 2003/0196077 A1 | 10/2003 | Henry et al. |
| 2004/0003211 A1 | 1/2004 | Damron |
| 2005/0053012 A1 | 3/2005 | Moyer |
| 2005/0055535 A1 | 3/2005 | Moyer et al. |
| 2005/0055543 A1 | 3/2005 | Moyer |
| 2005/0125647 A1 | 6/2005 | Symes et al. |
| 2007/0266227 A1 | 11/2007 | Kling |

FOREIGN PATENT DOCUMENTS

WO 2005/037326 A2 4/2005

OTHER PUBLICATIONS

PCT/US2009/045379 International Search Report and Written Opinion mailed Dec. 29, 2009 on Corresponding Application.
U.S. Appl. No. 12/164,444, filed Jun. 30, 2008.

*Primary Examiner* — Yong Choe
(74) *Attorney, Agent, or Firm* — Joanna G. Chiu; David G. Dolezal (57) ABSTRACT

Executing a first memory access instruction with update by an N-bit processor includes accessing at least one source register of a plurality of registers, wherein the accessing includes accessing a first register, wherein each register of the plurality of registers includes a main portion of N bits and an extension portion of M bits, wherein the main portion of the first register includes a first address operand. The execution of the first instruction further includes forming a memory access address using the first address operand; using the memory access address as an address for a memory access; producing an updated address operand; and writing the updated address operand to the main portion of the first register. The producing includes accessing an extension portion of a source register of the at least one source register to obtain modifying information and using the modifying information in the producing an updated address operand.

21 Claims, 5 Drawing Sheets

```
evldhx    rD, rA, rB   (U=0)
evldhux   rD, rA, rB   (U=1)
```

| NUMBER OF DATA SAMPLES | DATA SIZE | | | |
|---|---|---|---|---|
| | BYTE | HALFWORD | WORD | DOUBLE WORD |
| 8 | 000...00000111 | 000...00001110 | 000...000011100 | 000...0000111000 |
| 16 | 000...00001111 | 000...00011110 | 000...000111100 | 000...0001111000 |
| 32 | 000...00011111 | 000...00111110 | 000...001111100 | 000...0011111000 |
| 64 | 000...00111111 | 000...01111110 | 000...011111100 | 000...0111111000 |

*FIG. 9*

ADDRESSING SEQUENCE:

```
                            OXDCAABCF0
   UPDATED rA[32:63] → OXDCAABCF8
   UPDATED rA[32:63] → OXDCAABCF4
   UPDATED rA[32:63] → OXDCAABCFC
   UPDATED rA[32:63] → OXDCAABCF2
   UPDATED rA[32:63] → OXDCAABCFA
   UPDATED rA[32:63] → OXDCAABCF6
   UPDATED rA[32:63] → OXDCAABCFE
```

```
evldh    rD, rA, UIMM    (U=0)
evldhu   rD, rA, UIMM    (U=1)
```

| 0       5 | 6      10 | 11     15 | 16     20 | 21              31 |
|---|---|---|---|---|
| 0 0 0 1 0 0 | rD | rA | UIMM | 0 1 1 0 U 0 0 0 1 0 0 |

*FIG. 12*

```
lwzx    rD, rA, rB    (U=0)
lwzuz   rD, rA, rB    (U=1)
```

| 0       5 | 6      10 | 11     15 | 16     20 | 21              31 |
|---|---|---|---|---|
| 0 1 1 1 1 1 | rD | rA | rB | 0 0 0 0 U 1 0 1 1 1 0 |

*FIG. 13*
—PRIOR ART—

PROVISION OF EXTENDED ADDRESSING MODES IN A SINGLE INSTRUCTION MULTIPLE DATA (SIMD) DATA PROCESSOR

BACKGROUND

1. Field

This disclosure relates generally to data processors, and more specifically, to providing extended addressing modes in SIMD register extensions.

2. Related Art

Increased performance in data processing systems can be achieved by allowing parallel execution of operations on multiple elements of a vector. One type of processor available today is a vector processor which utilizes vector registers for performing vector operations. However, vector processors, while allowing for higher performance, also have increased complexity and cost as compared with processors using scalar general purpose registers. That is, a vector register file within vector processors typically includes N vector registers, where each vector register includes a bank of M registers for holding M elements. Another type of known processor is a single-instruction multiple-data (SIMD) scalar processor (also referred to as a "short-vector machine") which allows for limited vector processing while using a scalar general purpose register (GPR). Therefore, although the number of elements per operation is limited as compared to vector processors, reduced hardware is required.

Many different applications executed on SIMD processors requires specialized addressing, such as circular addressing or bit-reversed addressing. However, load and store instructions typically require a large amount of limited opcode space to encode due, for example, to large displacements. Therefore, there is often no opcode space left to support any additional functionality. Therefore, the specification of additional addressing control without increasing the opcode space is desirable.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, SIMD data processing instructions are provided which support the use of different addressing modes. For example, in one embodiment, an index form vector load or store instruction specifies two source general purpose registers, where the main portion of one source general purpose register (GPR) is used to provide a base address and the main portion of the other source GPR is used to provide an index value (i.e. an offset value). The extension portion of either the source GPR which provides the base address or the source GPR which provides the index value is used to provide additional addressing control information which allows for increased functionality of the vector load or store instruction. In one embodiment, a displacement form vector load or store instruction specifies one source GPR, where the main portion of the one source GPR is used to provide a base address and the extension portion of the one source GPR is used to provide additional addressing control information. In this manner, addressing mode functionality may be increased without increasing the opcode size.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero.

In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Also, as used herein, a word (w) includes 4 bytes, a half-word (h) includes 2 bytes, and a doubleword (d) includes 8 bytes. However, in alternate embodiments, a word may be defined as 2 bytes and a doubleword as 4 bytes. The symbol "$" or "0x" preceding a number indicates that the number is represented in its hexadecimal or base sixteen form. The symbol "%" preceding a number indicates that the number is represented in its binary or base two form.

Figure 1:
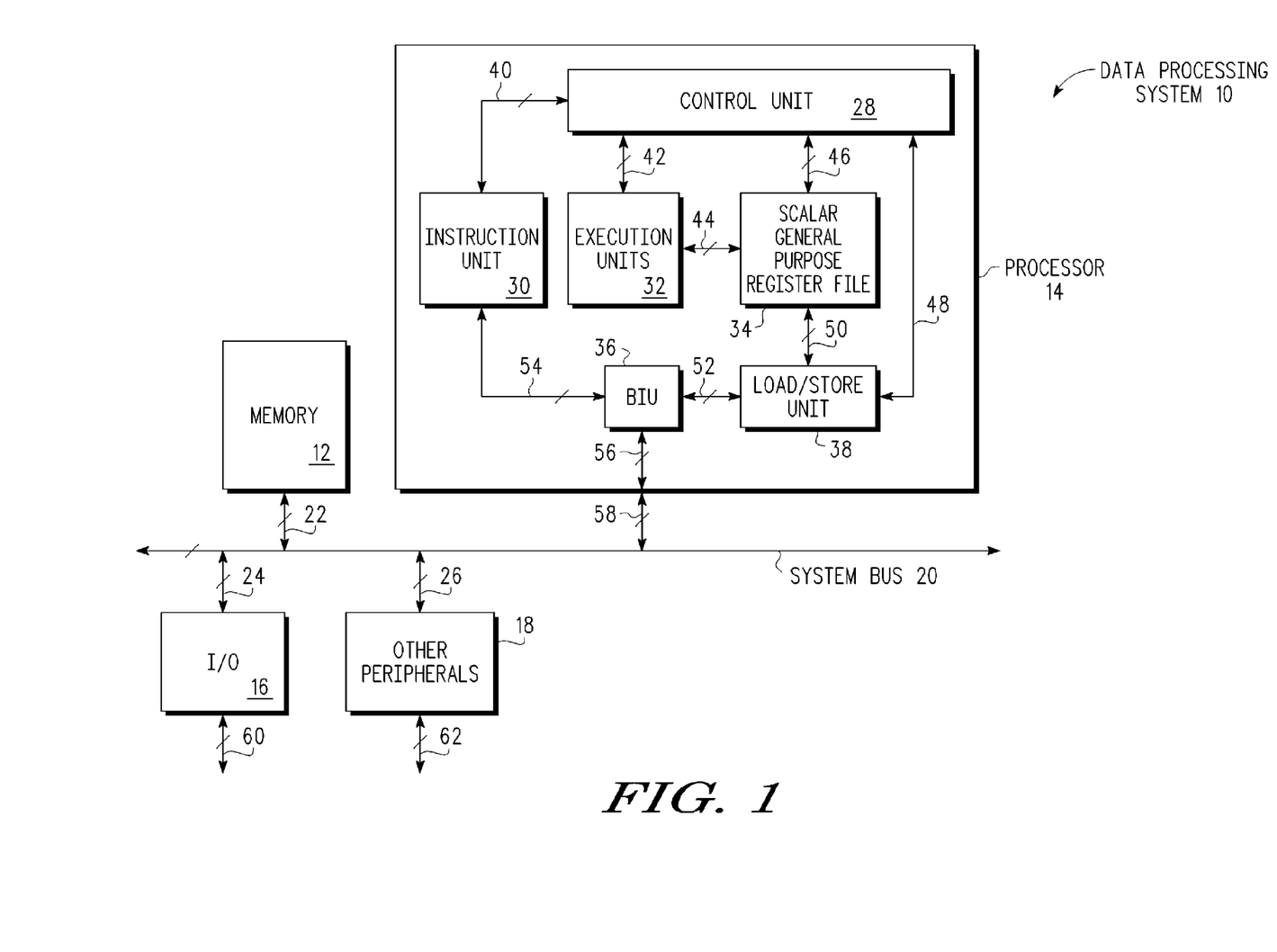
FIG. 1 illustrates in block diagram form a SIMD data processing system in accordance with one form of the present invention.

FIG. 1 illustrates, in block diagram form, a data processing system 10 in accordance with one embodiment of the present invention. Since data processing system 10 is capable of executing SIMD instructions, system 10 may also be referred to as a SIMD data processing system. Data processing system 10 includes a memory 12, a processor 14, an input/output (I/O) 16, other peripherals 18 and a system bus 20. Memory 12 is bidirectionally coupled to system bus 20 via conductors 22, I/O 16 is bidirectionally coupled to system bus 20 via conductors 24, the other peripherals 18 are bidirectionally coupled to system bus 20 via conductors 26, and processor 14 is bidirectionally coupled to system bus 20 via conductors 58. In one embodiment, the other peripherals 18 may include one or more peripherals, where each can be any type of peripheral, such as a universal asynchronous receiver transmitter (UART), a real time clock (RTC), a keyboard controller, other memories, etc. Some or all of the other peripherals 18 may be capable of communicating information external to data processing system 10 via conductors 62. I/O 16 may include any type of I/O circuitry which receives or provides information external to data processing system 10, via, for example, conductors 60. Memory 12 can be any type of memory, such as, for example, a read only memory (ROM), a random access memory (RAM), non-volatile memory (e.g. Flash), etc. Data processing system 10 may include elements other than those illustrated, or may include more or fewer elements than those illustrated. For example, data processing system 10 may include any number of memories or processors.

Processor 14 may be any type of processor, such as, for example, a microprocessor, microcontroller, digital signal processor, etc. In one embodiment, processor 14 may be referred to as a processor core. In another embodiment, processor 14 may be one of many processors in a multi-processor data processing system. Furthermore, although not illustrated as such, processor 14 may be a pipelined processor. Note also that processor 14 may also be referred to as a SIMD processor. In the embodiment illustrated in FIG. 1, processor 14 includes a control unit 28, an instruction unit 30, execution units 32, a scalar general purpose register (GPR) file 34, a bus interface unit (BIU) 36, and a load/store unit 38. Control unit 28 is bidirectionally coupled to instruction unit 30 via conductors 40, to execution units 32 via conductors 42, to scalar file 34 via conductors 46, and to load/store unit 38 via conductors 48. Execution units 32 are bidirectionally coupled to scalar register file 34 via conductors 44, and scalar register file 34 is bidirectionally coupled to load/store unit 38 via conductors 50. BIU 36 is bidirectionally coupled to instruction unit 30 via conductors 54 and to load/store unit 38 via conductors 52. Processor 14 is capable of bidirectionally communicating with system bus 20 via conductors 56 which are coupled to conductors 58. Note that processor 14 may include more circuitry than that illustrated, where the additional circuitry may also be coupled to conductors 58. That is, conductors 56 may communicate with system bus 20 via all or a portion of conductors 58. Note also that all or a portion of processor 14 may be referred to as processing circuitry.

In operation, instruction unit 30 fetches instructions from a memory, such as memory 12, via BIU 36 and system bus 20, and receives and provides control information from and to control unit 28. Instruction unit 30 can be any type of instruction unit as known in the art, and operates as known in the art, and therefore will not be described in more detail herein. Instruction unit 30 therefore provides instructions to control unit 28 which controls execution of these received instructions via, for example, execution units 32 and load/store unit 38, which are both capable of communicating with scalar register file 34, as needed, directly or via control unit 28. For example, control unit 28, via load/store unit 38 and BIU 36, is capable of loading data from memory (such as memory 12) to registers within scalar register file 34 as needed for executing instructions and is capable of storing data from registers within scalar register file 34 to memory (such as memory 12) as needed for executing instructions. For example, in one embodiment, load/store unit 38 can communicate directly with scalar register file 34 (to read and write data) via conductors 50 based on control information provided from control unit 28 via conductors 48. Execution units 32 can perform arithmetic, logical, shifting, or other operations using data stored within scalar register file 34 and store results to registers within scalar register file 34, as required for executing the instructions received from instruction unit 30 by way of control unit 28. Execution units 32 may include, for example, arithmetic logic units (ALUs), floating point units, etc. Scalar register file 34 can provide or receive control information or data to or from control unit 28 via conductors 46.

Operation of processor 14 will not be described in more detail herein other than for those portions that are needed in understanding the various embodiments described herein. Also note that existing designs for data processing systems having operands stored in a scalar general purpose register file can be modified as needed to execute the vector load and store instructions.

Figure 2:
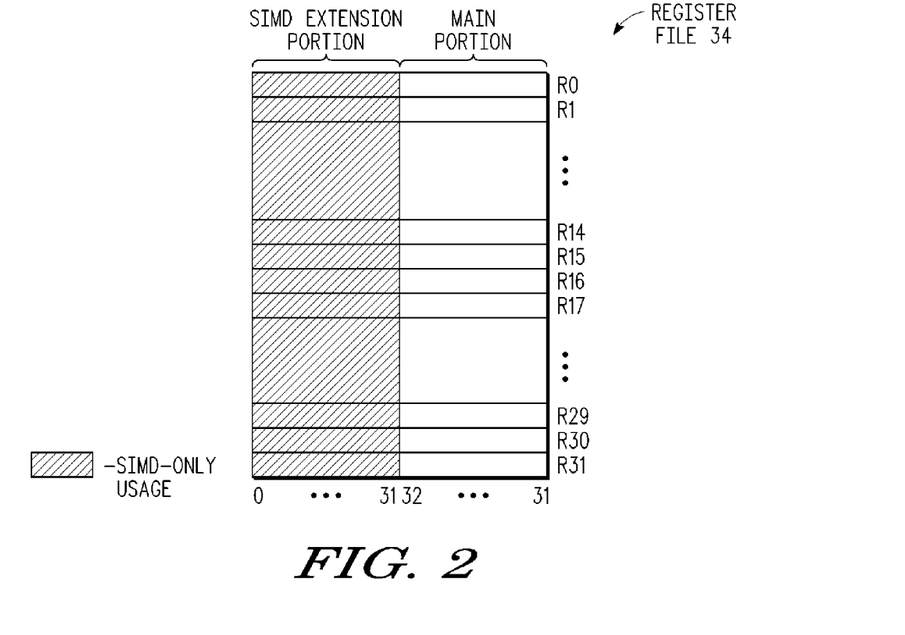
FIG. 2 illustrates in block diagram form the scalar general purpose register file of the SIMD data processing system of FIG. 1, in accordance with form of the present invention.

Illustrated in FIG. 2 is a block diagram of scalar general purpose register file 34. In the illustrated embodiment, scalar register file 34 includes 32 general purpose registers (GPRs). However, in alternate embodiments, scalar register file can include any number of GPRs. As used herein, a scalar register indicates a register which has a one dimensional map and thus holds only one row of data. Each GPR in scalar register file 34 includes a main portion (which includes the N lower bits of each GPR) and a SIMD extension portion (which includes the M upper bits of each GPR). In the illustrates embodiment, N is 32 bits and M is 32 bits, such that each GPR is a 64-bit register capable of storing a 64-bit quantity for SIMD operations. In the embodiments described herein, each GPR in scalar register file 34 includes 8 bytes, where, when used for SIMD operations, each GPR may store, for example, 2 word-size vector elements, 4 halfword-size vector elements, or 8 byte-size vector elements.

In the illustrated embodiment, the main portion of GPR file 34 is used for non-SIMD operations where the SIMD extension portion of GPR file 34 is not used when executing non-SIMD instructions, or when forming effective address (EA) values for load and store instructions (including vector load and vector store instructions). Furthermore, any values stored in an extension portion of a GPR are preserved when performing non-SIMD operations. In one embodiment, the number of bits, N, for the main portion is determined by the architecture of processor 14. For example, processor 14 is considered to be an N-bit processor. An N-bit processor refers to a processor whose native (e.g. non-extended) integer data type is N bits. Typically, the pointers in an N-bit processor are N bits; thus, a pointer value (stored within a main portion of a GPR) is capable of accessing $2^N$ bytes. That is, an N-bit processor has an N-bit address space. Therefore, in one embodiment, the number of bits, N, for the main portion of the GPRs is determined by the type of processor, or the Instruction Set Architecture of the processor. The number of bits, M, of the extended portion of the GPRs therefore extends beyond the N bits. In the illustrated embodiment, processor 14 is assumed to be a 32-bit processor (whose native, non-extended, integer data type is 32 bits and whose pointer values are 32 bits). Therefore, the main portion of the GPRs is 32 bits (i.e. N=32). In the illustrated embodiment, the main portion of the GPRs corresponds to the lower portion (e.g. lower half) of register file 34 (i.e. bits 32:63 of each GPR). In the illustrated embodiment, the extended portion is also 32 bits (i.e. M=32), and corresponds to the upper portion (e.g. upper half) of register file 34 (i.e. bits 0:31 of each GPR). Alternatively, scalar GPR file 34 can be organized differently, so long as the main portion includes N bits, and the extension portion includes M bits, beyond the N bits, such that each GPR (or a subset of GPRs used for SIMD operations) includes N+M bits. For example, the main portion may correspond to an upper portion and the extension portion to a lower portion of register file 34. Alternate embodiments may have different values for M and N, such as N=32 and M=96, where the width of a SIMD vector is correspondingly larger than the native integer data type for such embodiments, and thus supports larger SIMD vector lengths, while maintaining the base N-bit architecture of the processor.

In the illustrated embodiment of FIG. 2, the extension portion of register file 34 is shaded and referred to as a SIMD extension portion since the extension portion is only used for SIMD operations. In an alternate embodiment, other specialized functions may use the extension portion, such as double precision floating point values. However, in one embodiment, the extension portions are not used for non-SIMD integer operations within processor 14. Also, note that the extension portion of each register is not independently accessible or addressable apart from the main portion of each register. That is, for example, the extension portion of r0 is only accessible by accessing r0 and cannot be addressed independently from the main portion of r0 since the extension portion is simply an M-bit extension of the N-bit main portion of r0. This is also the case for each of the extension portions and main portions of GPRs r1-r31 illustrated in FIG. 2.

Figure 13:
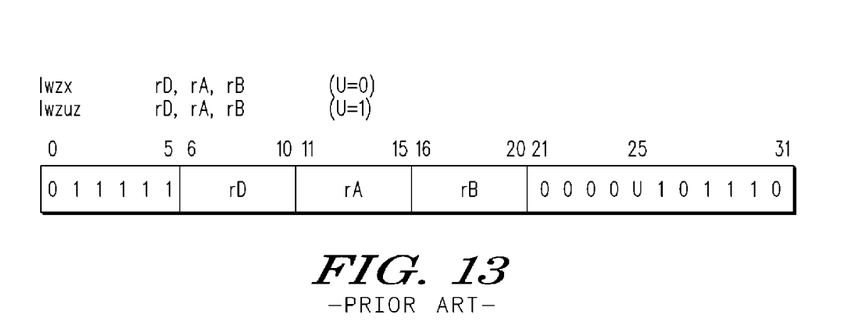
FIG. 13 illustrates, one form of a prior art non-SIMD index form load instruction for execution by the processor of FIG. 1.

Illustrated in FIG. 13 is one embodiment of an index form non-SIMD (i.e. scalar) integer load instruction (lwz[u]x), in accordance with the prior art. As illustrated in FIG. 13, lwz[u]x is a thirty-two bit instruction which indicates a destination register, rD, and two source registers, rA and rB. The lwz[u]x instruction allows for an update value (U) to be specified to indicate whether a load with index without update or a load with index and update is to be performed. In the case of U=1 (lwzux), an update of rA is to be performed as part of the operation of the instruction. In the case of U=0 (lwzx), no update of rA is performed. The lwz[u]x instruction includes an opcode field (bits 0:5) to identify the function or type of instruction. A destination field (bits 6:10) within the instruction is a destination register identifier labeled "rD" which identifies a register D within the scalar register file 34. A first source field (bits 11:15) within the instruction is a source register identifier labeled "rA" which identifies a register A within scalar register file 34, and a second source field (bits 16:20) within the instruction is a source register identifier labeled "rB" which identifies a register B within scalar register file 34. The instruction also includes a subopcode field (bits 21:31) which may be used to further specify the functionality of the instruction. Note that in the illustrated embodiment, U is included as a bit within the subopcode of the instruction (at bit location 25 in the illustrated embodiment).

The lwz[u]x instruction loads a 32-bit integer word from memory into the main portion of the destination register. Thus, in the illustrated embodiments where processor 14 is a 32-bit processor, the lwz[u]x instruction may be used to load a 32-bit integer word into the main portion of the destination register. Since this is a normal (non-SIMD) integer load instruction, the SIMD-only portion of the data register is not affected. The operation of the instruction is identical to operation of the instruction on an ISA compatible processor without SIMD capabilities. Upon execution of an lwz[u]x instruction, the contents of the main portion of rA (which stores a base address value) and the main portion of rB (which stores an index value) are used to calculate an effective address (e.g., EA[0:31]). The 32-bit word located at the memory location in memory 12 pointed to by EA[0:31] is then loaded into the main (integer) portion of rD. That is, the word pointed to by EA in memory 12 is loaded into rD[32:63]. If U=0 (i.e. a lwzx instruction), then no update of rA is performed. However, if U=1 (i.e. a lwzux instruction), in addition to the load operation which updates rD with the memory data, an update of rA is to be performed. That is, the update form of the normal load instructions may be used in order to update the base value of rA with a new base value equal to the computed EA[0:31] value used for the load operation for a subsequent load instruction using the updated base value. Update form instructions thus provide additional parallelism by combining a load operation with an address operand update operation into a single instruction. Note that for normal integer load instructions, the extension portion (SIMD-only portion) of registers rA, rB, and rD are neither used nor updated.

Similarly, note that a corresponding normal (non-SIMD, scalar) integer store instruction (stw[u]x rS, rA, rB) operates similar to the load instruction. The stw[u]x instruction stores the integer word from the GPR indicated by rS to the location in memory pointed to by EA (where the contents of rA, which stores the base address value, and rB, which stores the index value, are used to calculate EA[0:31]]. As with the load instruction, if U=0 (i.e. an stwx instruction), then no update of rA is performed. However, if U=1 (i.e. a stwux instruction), an update of rA is to occur by updating the main portion of rA with the calculated EA[0:31]. Note that for integer store instructions, the extension portion (SIMD-only portion) of registers rA, rB, and rS are neither used nor updated.

Figure 3:
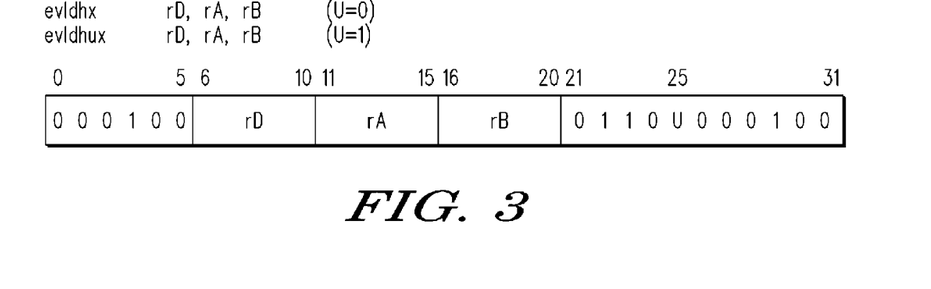
FIG. 3 illustrates one form of an index form load vector instruction for execution by the SIMD data processing system of FIG. 1, in accordance with one embodiment of the present invention.

Illustrated in FIG. 3 is one embodiment of an index form vector (SIMD) load instruction (evldh[u]x), in accordance with one embodiment of the present invention. In the illustrated embodiment, evldh[u]x is a thirty-two bit instruction which indicates a destination register, rD, and two source registers, rA and rB. The evldh[u]x instruction allows for an update value (U) to be specified to indicate whether a load with index without updated or a load with index and update is to be performed. In the case of U=1 (evldhux), an update of rA is to be performed as part of the operation of the instruction, which will be described in more detail below. In the case of U=0 (evldhx), no update of rA is performed. The evldh[u]x instruction includes an opcode field (bits 0:5) to identify the function or type of instruction. A destination field (bits 6:10) within the instruction is a destination register identifier labeled "rD" which identifies a register D within the scalar register file 34. A first source field (bits 11:15) within the instruction is a source register identifier labeled "rA" which identifies a register A within scalar register file 34, and a second source field (bits 16:20) within the instruction is a source register identifier labeled "rB" which identifies a register B within scalar register file 34. The instruction also includes a subopcode field (bits 21:31) which may be used to further specify the functionality of the instruction. Note that in the illustrated embodiment, U is included as a bit within the subopcode of the instruction (at bit location 25 in the illustrated embodiment). However, in alternate embodiments, the indication of whether or not to update can be provided as different opcodes or as a different bit within the instruction. Alternatively, other bit length instructions may be implemented and the bit size of each instruction field is implementation specific. However, as discussed above, note that in many instruction set architectures, opcode and subopcode space is limited, and thus, additional instruction bit length may not be available. Also, in other embodiments additional fields or other fields may be implemented. Further, the ordering of the fields rD, rA and rB may be changed to other sequences than the one as illustrated in FIG. 3.

The evldh[u]x instruction loads a doubleword from memory into four halfwords of the destination register. Thus, in the illustrated embodiments where processor 14 is a 32-bit processor, the evldh[u]x instruction may be used to load 4 16-bit vector elements into the SIMD destination register. Upon execution of an evldh[u]x instruction, the contents of rA (which stores a base address value) and rB (which stores an index value) are used to calculate an effective address (e.g., EA[0:31]). (Note that if the index value in rB is 0, then the base address value in rA can be directly used as the EA.) The doubleword located at the memory location in memory 12 pointed to by EA[0:31] is then loaded into the combined extended and main portions of rD. That is, the halfword pointed to by EA in memory 12 is loaded into rD[0:15], the halfword pointed to by EA+2 in memory 12 is loaded into rD[16:31], the halfword pointed to by EA+4 in memory 12 is loaded into rd[32:47], and the halfword pointed to by EA+6 in memory 12 is loaded into rD[48:63]. (Note that, as will be discussed below in reference to a circular buffer addressing example, any of these EA's used to load the 4 vector elements into rD may wrap at a length boundary of a circular buffer.) If U=0 (i.e. an evldhx instruction), then no update of rA is performed. However, if U=1 (i.e. an evldhux instruction), in addition to the load operation which updates the entire contents of rD (both the main and extension portions) with the memory data, the extension portion of rA or rB is used to determine how an update of rA is to be performed. That is, an extension portion of rA or rB can be used to further provide control information which defines how the update of rA is to occur in order to implement different addressing schemes, such as linear addressing, circular buffer addressing with wrap-around, or bit-reversed addressing. In one embodiment, the updated value of rA is based on the previous value of rA, where this can be achieved by modifying the base address or the EA. Update forms of the SIMD load instructions may be selected in order to update the base value of rA with a new base value for a subsequent load instruction using the updated base value. Update form instructions may thus provide additional parallelism by combining a load operation with an address operand update operation into a single SIMD instruction.

Similarly, note that the corresponding SIMD store instruction (evstdh[u]x rS, rA, rB) operates similar to the SIMD load instruction. The evstdh[u]x instruction stores four halfwords from the GPR indicated by rS to the location in memory pointed to by EA (where the contents of rA, which stores the base address value, and rB, which stores the index value, are used to calculate EA[0:31]). (Note that if the index value in rB is 0, then the base address value in rA can be directly used as the EA.) As with the SIMD load instruction, if U=0 (i.e. an evstdhx instruction), then no updated of rA is performed. However, if U=1 (i.e. an evstdhux instruction), the extension portion of rA or rB is used to determine how the update of rA is to be performed. That is, an extension portion of rA or rB can be used to further provide control information (i.e. modifying information) which defines how the update of rA is to occur in order to implement different addressing techniques, such as, for example, circular buffer addressing with wrap-around or bit-reversed addressing, when executing SIMD load or store instructions. Therefore, the descriptions which follow regarding the calculation of EA and the use of an extension portion to further define how an update is to be performed when U=1 apply to both the index form SIMD load and the index form SIMD store instructions. However, for ease of explanation, many of the examples herein correspond to the SIMD load instruction. Also, note that any element size can be defined in the SIMD load or store instruction other than a halfword. For example, the descriptions provided herein may also apply analogously to an evldb[u]x or evstdb[u]x which loads or stores, respectively, 8 bytes from or to memory. The descriptions may also apply analogously to an evldw[u]x or evstdw[u]x which loads or stores, respectively, 2 words from or to memory.

Figure 4:
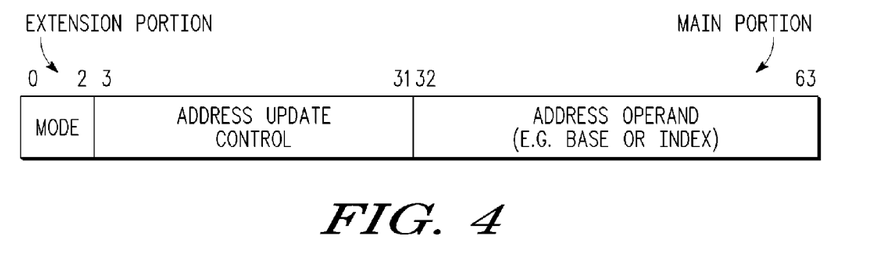
FIG. 4 illustrates in block diagram form a general purpose register of the scalar general purpose register file of FIG. 2 in accordance with one embodiment of the present invention.

FIG. 4 illustrates an extension portion and a main portion of a GPR, in accordance with one example of the present invention. The main portion of the GPR (bits 32:63) stores an address operand (e.g. the base address or the index value). Therefore, this may correspond to the main portion of the GPR designated by rA (which stores the base address as an address operand) or the main portion of the GPR designated by rB (which stores the index value as an address operand). The extension portion (bits 0:31) includes a mode field and an address update control field. In the illustrated embodiment, the mode field is a 3-bit field located in bits 0:2, and the address update control field is a 29-bit field located in bits 3:31 of the GPR. The mode field may be used to define what type of address update is to be performed for a SIMD load or store instruction, and the address update control field may provide additional control information, if needed, for the update. In one embodiment, if the mode field has a value of %000, then a normal update operation, as is performed when executing the normal integer load and store instructions with update (discussed above in reference to FIG. 13), is indicated in which the calculated EA[0:31] is stored into the main portion of rA (rA[32:63]). If the mode field has a value of %001, then a circular buffer address update is performed where the main portion of rA (rA[32:63]) is updated with the address value of the next circular buffer element to be accessed. Additional information stored in the address update control field is used to perform this update, as will be described in more detail below in reference to FIGS. 5 and 6. If the mode field has a value of %010, then a bit-reversed address update is performed where the main portion of rA (rA[32:63]) is updated with the address value of the next buffer element to be accessed according to bit-reversed addressing (such as, for example, to access a buffer storing FFT data). Additional information stored in the address update control field is used to perform this update, as will be described in more detail below in reference to FIGS. 7-11. Therefore, if U=1 for the SIMD load or store instruction, the value of the mode field of the extension portion of either rA or rB is used to indicate how an update of the main portion of rA will be performed, where the address update control field is used as needed to perform these updates. Note that if U=0, no extension portion is accessed. Also note that no extension portion is accessed for normal integer load or store with update instructions, regardless of the value of the corresponding U bit for those instructions.

In the examples which follow, it will be assumed that, for SIMD load and store instructions, if U=1, the extension portion of rA will be accessed to determine how to perform the address update of the main portion of rA. (Alternatively, note that if U=1, processor 14 may be designed such that the extension portion of rB rather than the extension portion of rA is accessed to determine how to perform the address update of the main portion of rA.) Note that through the use of the extension portion, a separate GPR or address location need not be independently addressed or accessed in order to provide additional information such as the mode or address update control information. Furthermore, additional fields within the instruction are not needed, since the instruction already indicates rA for the purposes of providing the base address value. However, since only the main portion of rA is needed to access the base address value, the extension portion can be used to provide additional information. Note that regardless of the value of U or the mode field, the effective address calculation for either the vector load or store instructions remains unchanged. That is, the EA for the evldh[u]x or the evstdh[u]x is calculated by adding the contents of rA (rA[32:63]) to the contents of rB (rB[32:63]). That is, EA[0:31]="the contents of rA+the contents of rB". Also, note that the EA is a 32-bit value in the illustrated example in which processor 14 is assumed to be a 32-bit processor. The EA may also be referred to as a memory access address since it provides the memory address to which data will be stored or from which data will be loaded.

Figure 5:
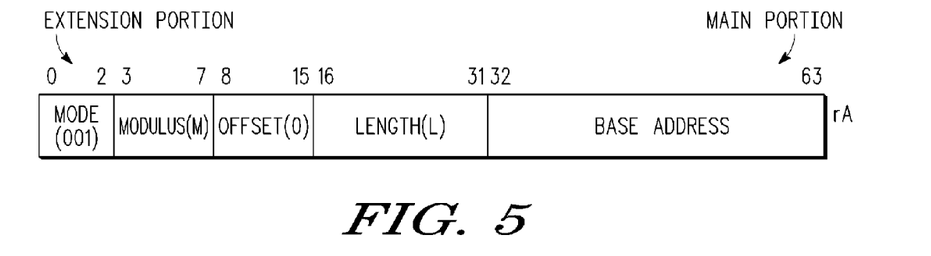
FIG. 5 illustrates in block diagram form a general purpose register of the scalar general purpose register file of FIG. 2 in accordance with one embodiment of the present invention.

Illustrated in FIG. 5 is an example of a main portion and an extension portion of rA which can be used for the execution of a evldh[u]x instruction (or an evstdh[u]x instruction) to implement circular buffer addressing. The main portion of rA, as discussed above, includes the base address as the memory operand. The mode field within the extension portion of rA is %001, indicating a circular buffer addressing technique, and the address update control field includes additional information for implementing the circular buffer addressing. In the illustrated embodiment, the address update control field includes a 5 bit modulus (Mod) field in bits 3:7, an 8-bit offset (O) field in bits 8:16, and a 16-bit length (L) field in bits 16:31. Note that alternate embodiments may organize the information within the extension portion of rA differently, or may include other types of information in addition to or in place of any of the modifying information in the address update control field. The L field provides the number of elements in the circular buffer. The O field provides the distance to the next element for the update calculation. The Mod field indicates that the starting address of the circular buffer in memory is aligned to a $2^{Mod}$ byte boundary in memory. Note that the Mod field also defines the maximum length allowable for the circular buffer. As will be seen below, this allows for a faster wrap around calculation.

Figure 6:
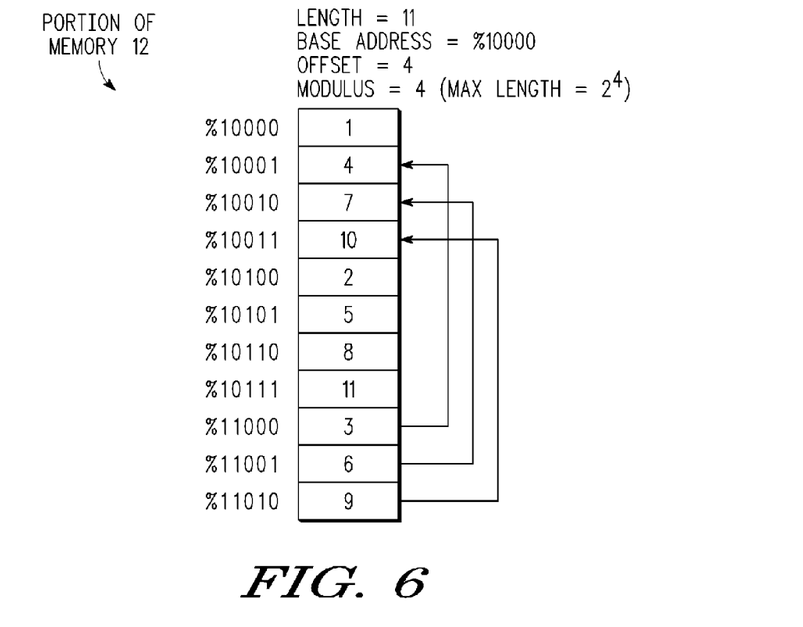
FIG. 6 illustrates in block diagram form a portion of the memory of FIG. 1 to illustrate an example of circular buffer addressing.
Figure 7:
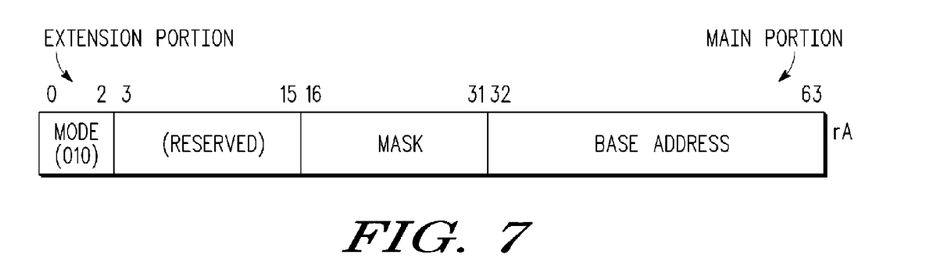
FIG. 7 illustrates in block diagram form a general purpose register of the scalar general purpose register file of FIG. 2 in accordance with one embodiment of the present invention.

FIG. 6 illustrates a portion of memory 12 which stores a circular buffer. (Note that the circular buffer of FIG. 6 may be referred to as a data structure and can be formed within memory 12 prior to being accessed.) The starting address (i.e. the base address) of the circular buffer in FIG. 6 is provided as %10000. The length of the circular buffer is 11 (indicating 11 bytes), and the offset (i.e. the distance between elements accessed) is 4 bytes. Therefore, note that the buffer elements are numbered 1-11 indicating the order in which they are to be accessed according to the base address of %10000 and offset value of 4. That is, first, location %1000 is accessed, followed by location %10100, followed by location %11000, followed by location %10001 (which includes a wrap around), followed by location %10101, followed by location %11001, followed by location %10010 (which again includes a wrap around), followed by location %10110, followed by location %11010, followed by location %10011 (which also includes a wrap around), followed by location %10111, etc.

Therefore, upon execution of an evldhux instruction (U=1) in which the mode field is %001, the base address is %10000 (the index value is assumed to be 0 in this example), and the offset=4, rD is loaded with the contents of the memory location addressed by %10000. Also, the main portion of rA will be updated to %10100 as part of the execution of the evldhux such that a separate instruction is not needed to advance the access point of the circular buffer to the next element located 4 bytes away. (At this point, one or more additional instructions may be executed which use the results in rD.) Note also that only the main portion of rA is updated, while the extension portion of rA (including the mode field and address update field) remains unchanged. Therefore, upon execution of a subsequent evldhux instruction, using the updated version of rA, rD is updated with the contents of the memory location addressed by %10100, and the main portion of rA is again updated, from %10100 to %11000. Since the extension portion of rA was not updated, the length is still provided as 11 and the offset as 4. Upon execution of a subsequent evldhux instruction, the addition of 4 to %11000 (which is %11110) will result in the address surpassing the last element of the buffer (%11010). This can be determined using the least 4-significant bits of the address, since it is known, for this example, that the starting address of the circular buffer is aligned to %10000 ($2^{Mod}=2^4$=%10000) and the length is 11. In this case, the length of the buffer can be subtracted from the address to result in the next element address of %10001. However, since it is known that the starting element of the buffer address is %10000 (due to the mod value, e.g. $2^{Mod}=2^4$=%10000, it is aligned on a 16-byte boundary), the mod value can be used to determine which portion of the starting buffer address is to be updated upon a wrap-around. That is, in the case of a wrap-around, rA[(64-Mod):63]=(rA[48:63]+Offset)[(64-Mod):63] in which only bits (64-Mod):63 are modified upon an update. Therefore, rD is updated with the contents of the memory location addressed by %11000 and the main portion of rA is updated from %11000 to %10001 (and not %11110, due to the wrap around). Note that the mod value also provides the maximum index of the buffer as $2^{(Mod)}-1$. That is, in order to use the mod value to perform the wrap around calculations, the last circular buffer element cannot be located beyond %11111.

Illustrated in FIG. 5, is an example of a main portion and an extension portion of rA which can be used for the execution of a evldh[u]x instruction (or an evstdh[u]x instruction) to implement bit-reversed addressing. The main portion of rA, as discussed above, includes the base address as the address operand. The mode field within the extension portion of rA is %010, indicating a bit-reversed addressing technique, and the address update control field includes additional information for implementing the bit-reversed addressing. In the illustrated embodiment, the address update control field includes a 16-bit mask field in bits 16:31. Note that alternate embodiments may organize the information within the extension portion of rA differently, or may include other types of information in addition to or in place of any of the modifying information in the address update control field. The mask field provides a mask value that is used to perform bit-reversed incrementing.

Figure 8:
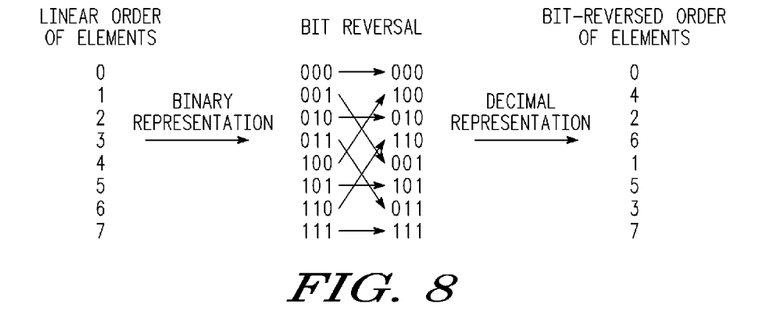
FIG. 8 illustrates an example of bit-reversed addressing.

Many types of filtering algorithms utilize buffers to hold sets of input samples and computed output samples from a set of filtering operations, such as FFT filters. These filters are typically accessed in a bit-reversed fashion to obtain the data and store output in a predetermined order which corresponds to the natural order of computations. For example, for an 8 element FFT buffer having elements 0, 1, 2, 3, 4, 5, 6, and 7 stored in a linear order, the bit-reversed order in which they need to be accessed is elements 0, 4, 2, 6, 1, 5, 3, and 7. FIG. 8 illustrates an example of bit-reversed addressing which may be used when accessing data elements in a bit-reversed manner, such as, for example, when accessing FFT data elements from a buffer stored in memory 12. In the example of FIG. 8, it is assumed that 8 data elements (elements 0-7) are stored in linear order. Each of these elements can be addressed by a 3-bit binary address representing the values 0 to 7. These binary values, %000, %001, %010, %011, %100, %101, %110, and %111, correspond to each of elements 0-7, respectively. These binary values are then "bit-reversed", resulting in the mirror image of each 3-bit binary value. Upon bit-reversing each of these binary values, the bit-reversed elements result in the elements 0-7 being addressed in the bit-reversed order of element 0, element 4, element 2, element 6, element 1, element 5, element 3, and element 7, respectively. Note that, for ease of explanation, the examples which will be described herein assume a buffer of 8 data elements to be accessed in a bit-reversed manner; however, in alternate embodiments, a buffer of any number of data elements can be addressed in a bit-reversed order.

Figure 9:
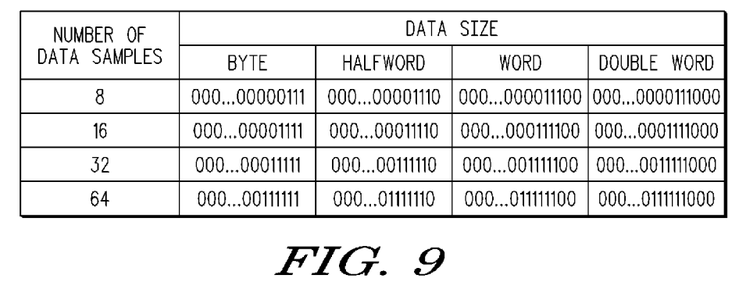
FIG. 9 illustrates a table of example values for masks for different data sizes and number of data which may be used for determining bit-reversed addressing increments.

The mask value, which is based on a number of data elements or samples in a buffer (e.g. the number of points in an FFT) as well as the data size of a sample, is used to determine a next element to be accessed in a bit-reversed fashion. Known methods of using the mask value to determine the next element to be accessed in a bit-reversed fashion may be used. FIG. 9 illustrates an example of a table which provides various mask values based on both number of data samples and data sample size. To access a buffer containing n byte-sized data elements that is to be accessed with bit-reversed addressing, the mask value has $\log_2 n$ ones (1s) in the least significant bit positions and zeroes (0s) in the remaining most significant bit positions. If, however, the data size is a multiple of a halfword or a word, the mask is constructed so that the 1s are shifted left by $\log_2$ (size of the data in bytes) and 0s are placed in the least significant bit positions. Note that, for each row of the table, the mask values, as they progress from the byte column to the doubleword column, are shifted to the left by one bit each time. Also, note that for each column of the table, the mask values, as they progress from the size of 8 elements down to the size of 64 elements, have an additional lower order bit set to "1". The table of FIG. 9 can be expanded to include larger buffer sizes, which are typically powers of 2, and may include larger data sizes as well. The table of FIG. 9 may be stored within control unit 28 of FIG. 1, or may be stored elsewhere within system 10. The table of FIG. 9 may be stored as a table of values or may be implemented with logic gates. Alternate embodiments may store or receive the information of the table of FIG. 9 in a variety of different manners.

Figure 10:
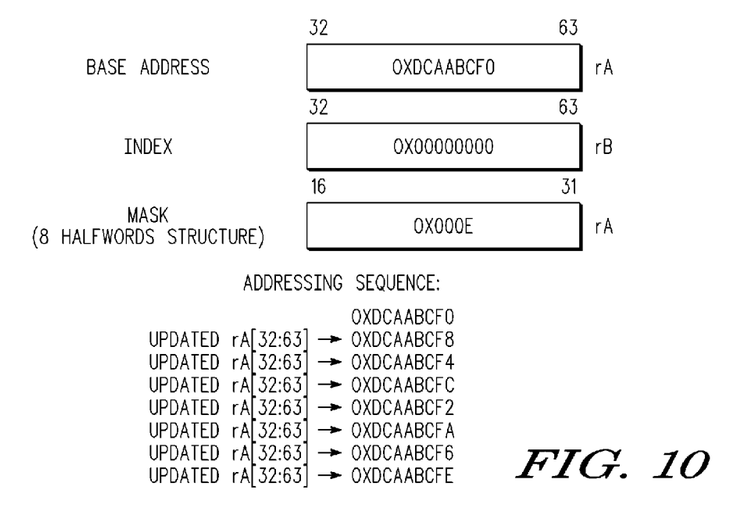
FIG. 10 illustrates, in diagram form, an example base address pointer value, an example index value, an example mask value, and an example bit-reversed addressing sequence in accordance with one embodiment of the present invention.
Figure 11:
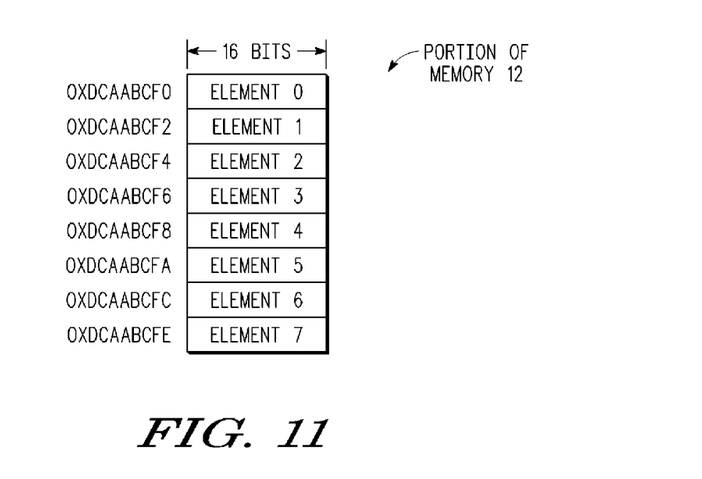
FIG. 11 illustrates, in diagram form, a portion of the memory of the SIMD data processing system of FIG. 1 storing data elements of a Fast Fourier Transfer (FFT) buffer

FIG. 10 illustrates a bit-reversed addressing sequence which may be achieved using evldh[u]x instructions to access the example buffer of FIG. 11. In the example of FIG. 11, the buffer stores 8 data elements where each data element is a halfword in size. (Note that the buffer of FIG. 11 may be used in an FFT application, and may also be referred to as an FFT sample buffer. Note also that the buffer of FIG. 11 may be referred to as a data structure and can be formed within memory 12 prior to being accessed.) For example, FIG. 11 illustrates a portion of memory 12 which stores 8 halfword-sized data elements starting at address location 0xDCAABCF0. Since each element is a halfword in size (e.g. 16 bits), the next 7 elements, element 1-element 7, are sequentially addressed in linear order by address values 0xDCAABCF2, 0xDCAABCF4, 0xDCAABCF6, 0xDCAABCF8, 0xDCAABCFA, 0xDCAABCFC, and 0xDCAABCFE, respectively. (Note that each of these address values may also be referred to as pointer values.) If these were to be accessed in a bit-reversed order (as described in FIG. 8), then these addresses would be accessed in the following order: 0xDCAABCF0 (corresponding to element 0), 0xDCAABCF8 (corresponding to element 4), 0xDCAABCF4 (corresponding to element 2), 0xDCAABCFC (corresponding to element 6), 0xDCAABCF2 (corresponding to element 1), 0xDCAABCFA (corresponding to element 5), 0xDCAABCF6 (corresponding to element 3), and 0xDCAABCFE (corresponding to element 7).

Therefore, in the example of bit-reversed addressing in FIG. 10, a base address value (i.e. initial pointer value) of 0xDCAABCF0 is placed into the main portion of register rA, prior to execution of the evldh[u]x instruction, where this points to the first element, element 0, of the buffer in memory 12 to be accessed. The value of 0x00000000 is placed in rB as the index value. Also, for this example, the mask value (taken from the table of FIG. 4) is "000 . . . 00001110," since the buffer contains 8 halfword-sized data elements. This mask value, corresponding to 0x000E, is stored in the extension portion of rA. Therefore, upon execution of an evldhux instruction, in which U=1 and the mode field is %010, the EA is calculated to be 0xDCAABCF0 (the base address+index value), and rD receives the contents of mem[EA], which is element 0 of the buffer. (Note that, in this example, since the index value in rB is 0, the base address value can be provided directly as the EA.) Also, since U=1 and the mode field is %010, upon execution of the evldhux instruction, the address update control field in the extension portion of rA (i.e. the mask value) is used to determine how to update the main portion of rA. Using any known method, the mask value of 0x000E is used to calculate the next address in the bit-reversed addressing sequence (i.e. 0xDCAABCF8, which corresponds to element 4). Therefore, the main portion of rA is updated to the new base address value of 0xDCAABCF8. Note that only the main portion of rA is updated such that the mask value and mode field value remains unchanged. Also, at this point, one or more additional instructions may be executed which use the results in rD (element 0) in a subsequent data processing operation. Upon execution of a subsequent evldhux instruction with U=1 and using the same rA and rB, the mode value is still %010 and the mask value is still 0x000E. In this case, the base value is 0xDCAABCF8, as was updated with the previous evldhux instruction. Again, using known methods, the mask value of 0x000E is used to calculate the next address following 0xDCAABCF8 in the bit-reversed addressing sequence (i.e. 0xDCAABCF4, which corresponds to element 2). Therefore, the contents of 0xDCAABCF4, element 2, is loaded into rD, and the main portion of rA is updated to 0xDCAABCF4. In this manner, a series of evldhux instructions may be used to access the buffer elements of the buffer of FIG. 11 in a bit-reversed order in which the main portion of rA can be updated to reflect the next address in the bit-reversed addressing sequence (since U=1).

Note that the above circular buffer addressing example and bit-reversed addressing example were described in reference to loading elements from memory; however, the above methods also apply to storing elements to memory where, when U=1 in a evstdh[u]x instruction, and mode=%001 or %010, the main portion of rA can be updated as described above for each addressing scheme to point to the next address location to which a data element will be stored.

Figure 12:
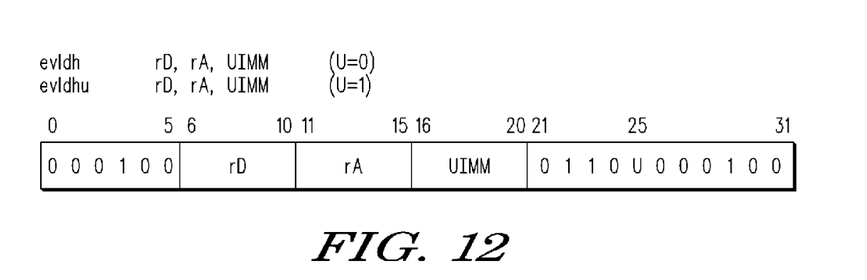
FIG. 12 illustrates one form of a displacement form load vector instruction for execution by the SIMD data processing system of FIG. 1, in accordance with one embodiment of the present invention.

Illustrated in FIG. 12 is one embodiment of a displacement form vector load instruction (evldh[u]). In the illustrated embodiment, evldh[u] is a thirty-two bit instruction which indicates a destination register, rD, one source register, rA, and an immediate value field which provides a displacement value. The evldh[u] instruction allows for an update value (U) to be specified to indicate whether a load with displacement or a load with displacement and update is to be performed. In the case of U=1 (evldhu), an update of rA is to be performed as part of the operation of the instruction. In the case of U=0 (evldh), no update of rA is performed. The evldh[u] instruction includes an opcode field (bits 0:5) to identify the function or type of instruction. A destination field (bits 6:10) within the instruction is a destination register identifier labeled "rD" which identifies a register D within the scalar register file 34. A source field (bits 11:15) within the instruction is a source register identifier labeled "rA" which identifies a register A within scalar register file 34. An unsigned immediate field (UIMM, bits 16:20) within the instruction is an immediate value which provides a displacement value. The instruction also includes a subopcode field (bits 21:31) which may be used to further specify the functionality of the instruction. Note that in the illustrated embodiment, U is included as a bit within the subopcode of the instruction (at bit location 25 in the illustrated embodiment). However, in alternate embodiments, the indication of whether or not to update can be provided as different opcodes or as a different bit within the instruction. Alternatively, other bit length instructions may be implemented and the bit size of each instruction field is implementation specific. However, as discussed above, note that in many instruction set architectures, opcode and subopcode space is limited, and thus, additional instruction bit length may not be available. Also, in other embodiments additional fields or other fields may be implemented. Further, the ordering of the rD field, rA field, and the immediate field may be changed to other sequences than the one as illustrated in FIG. 12.

The evldh[u] instruction (evldh[u] rD, rA, UIMM) is similar to the evldh[u]x instruction; however, rather than providing a second source register, rB, which stores an index value used to calculate the EA, the evldh[u] instruction provides an immediate value within the instruction itself that is directly used to calculate the EA. Similar to the evldh[u]x instruction, the evldh[u] instruction loads a doubleword from memory into four halfwords of the destination register. Thus, in the illustrated embodiments where processor 14 is a 32-bit processor, the evldh[u] instruction may be used to load 4 16-bit vector elements into the destination register. However, upon execution of an evldh[u] instruction, the displacement value (UIMM) provided within the immediate field of the instruction is added to the contents of rA (which stores a base address value) to calculate an effective address (e.g., EA[0:31]). The doubleword located at the memory location in memory 12 pointed to by EA[0:31] is then loaded into rD. That is, the halfword pointed to by EA in memory 12 is loaded into rD[0:15], the halfword pointed to by EA+2 in memory 12 is loaded into rD[16:31], the halfword pointed to by EA+4 in memory 12 is loaded into rD[32:47], and the halfword pointed to by EA+6 in memory 12 is loaded into rD[48:63].

If U=0 (i.e. an evldh instruction), then no update of rA is performed. However, if U=1 (i.e. an evldhu instruction), the extension portion of rA can be used to determine how the update of rA is to be performed. In one embodiment, if U=1 (i.e. an evldhu instruction), both the extension portion of rA and UIMM is used to determine how the update of rA is to be performed. For example, in one embodiment, if U=1 and UIMM is not 0, then, regardless of the value of the mode field in the extension portion of rA, a normal update is performed in which the value of EA is stored into the main portion of rA (rA[32:63]), in the same manner as in a normal integer load with displacement and update (analogous to the update performed for the normal integer load with index and update described above in reference to FIG. 13). However, if the UIMM value=0 and U=1, then an update form is indicated, but normally, no change in value of rA would occur, since the addition of the UIMM value of zero to the current value in rA would not provided an altered rA value. Thus, in one embodiment, the U=0, UIMM=0 and the U=1, UIMM=0 variants of the instruction produce the same result. This provides an opportunity to use such an instruction encoding to indicate that additional update control values are to be used for SIMD load or store instructions, such as in the extension portion of rA. So, if U=1, UIMM=0, and the mode field value in the extension portion of rA is %000, then a normal update is performed in which the value of EA is stored into the main portion of rA (rA[32:63]). However, if U=1, UIMM=0, and the mode field value in the extension portion of rA is %001 or %010, then a circular buffer addressing update or a bit-reversed addressing update, respectively, as was described above, is performed for the main portion of rA. That is, in these cases (where the mode field is %001 or %010), the extension portion of rA is used to further provide control information (e.g. the address update control field) which defines how the update of rA is to occur in order to implement different addressing schemes, such as circular buffer addressing with wrap-around or bit-reversed addressing. Therefore, the descriptions provided above with respect to FIGS. 4-11 in which the extension portion of rA is used to provide additional modifying information with respect to how to update the main portion of rA also apply to the evldh[u] instruction.

Similarly, note that the corresponding store instruction (evstdh[u]x rS, rA, UIMM) operates similar to the load instruction. The evstdh[u] instruction stores four halfwords from the GPR indicated by rS to the location in memory pointed to by EA (where the contents of rA, which stores the base address value, and UIMM, the displacement value, are used to calculate EA[0:31]). As with the load instruction, if U=0 (i.e. an evstdh instruction), then no update of rA is performed. However, if U=1 (i.e. an evstdhu instruction), the extension portion of rA and the value of UIMM can be used to determine how the update of rA is to be performed. That is, when a value of UIMM=0 is indicated in the instruction, an extension portion of rA can be used to further provide control information (i.e. modifying information) which defines how the update of rA is to occur in order to implement different addressing techniques, such as, for example, circular buffer addressing with wrap-around or bit-reversed addressing. Therefore, the descriptions provided above regarding the calculation of EA and the use of UIMM and an extension portion to determine how an update is to be performed when U=1 apply to both the displacement form load and the displacement form store instructions. Also, note that any element size can be defined in the load or store instruction other than a halfword. For example, the descriptions provided herein may also apply analogously to an evldb[u] or evstdb[u] which loads or stores, respectively, 8 bytes from or to memory. The descriptions may also apply analogously to an evldw[u] or evstdw[u] which loads or stores, respectively, 2 words from or to memory.

By now it should be appreciated that there has been provided data processing instructions for use in a data processing system which are capable of using an extension portion of one of its source registers to provide additional information with respect to how to modify a main portion of one of its source registers. In this manner, additional opcode space is not necessary. Furthermore, in one embodiment, one or more bits within these instructions (e.g., the U bit) may be used to determine whether or not an update of the main portion of one of the source registers is to be performed and whether or not the address update control information in the extension portion is to be used in calculating the new updated value. In another embodiment, the value of a displacement field within the instruction may be used to determine whether or not the address update control information in the extension portion is to be used in calculating the new updated value.

Note that the circuitry within processor 14 which may be used to implement the circular buffer addressing or the bit-reversed addressed, as was discussed above, may be located within control unit 28 or within execution units 32. Known circuitry may be used to implement the functionality described above with respect to determining the next address according to a circular buffer addressing technique or a bit-reversed addressing technique. Note that additional or alternate addressing modes or types may be indicated by means of alternate mode encodings in a similar manner to the illustrated techniques of circular addressing and bit-reversed addressing.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, data processing system 10 may include any number of separate integrated circuits or separate devices interconnected with each other. For example, memory 12 may be located on a same integrated circuit as processor 14 or on a separate integrated circuit or located within another peripheral or slave discretely separate from other elements of data processing system 10. Peripherals 18 and I/O circuitry 16 may also be located on separate integrated circuits or devices. It should also be understood that all circuitry described herein may be implemented either in silicon or another semiconductor material or alternatively by software code representation of silicon or another semiconductor material. As such, system 10 may be embodied in a hardware description language of any appropriate type. The software code or hardware description language may be embodied on any type of computer readable media.

Furthermore, those skilled in the art will recognize that boundaries between the functionality of the above described operations are merely illustrative. In some examples the functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 12 or other media on other computer systems. Such computer readable media may be permanently, removably or remotely coupled to an information processing system such as system 10. Computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, various numbering formats other than hexadecimal may be used. Changes to the data processing architecture may be used. Any of a variety of known data storage circuits may be used to implement the memories and registers. The bit sizes of the data buses, registers, vector fields and data operands may be changed depending upon the application. Additionally, the values used for the predetermined constants may be changed to have other values than the ones illustrated herein. Any type of semiconductor processing technology may be used to implement the circuitry described herein. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a method of operating a data processing system which includes executing a first instruction by an N-bit processor, where the first instruction is a memory access instruction with update, where the execution of the first instruction includes: accessing at least one source register of a plurality of registers, where the accessing the at least one source register includes accessing a first register of the plurality of registers, where each register of the plurality of registers includes a main register portion of N bits and an extension register portion of M bits, where the main register portion of the first register includes a first address operand; forming a memory access address using the first address operand; using the memory access address as an address for a memory access; producing an updated address operand, wherein the updated address operand is based on the first address operand; and writing the updated address operand to the main portion of the first register. The producing includes accessing an extension portion of a source register of the at least one source register to obtain modifying information and using the modifying information in the producing an updated address operand.

Item 2 includes the method of item 1, where the accessing an extension portion of a source register of at least one source register to obtain modifying information includes accessing the extension register portion of the first register to obtain the modifying information.

Item 3 includes the method of item 2 where the first registers is a base register for the first instruction and the first address operand is a base address.

Item 4 includes the method of item 1 where the at least one source register includes an index register of the plurality of registers, wherein the accessing an extension portion of a source register of at least one source register to obtain modifying information includes accessing the extension register portion of the index register to obtain the modifying information.

Item 5 includes the method of item 1, where the first instruction is for accessing a memory operand stored in a circular buffer, and the modifying information includes an indication of buffer length of the circular buffer.

Item 6 includes the method of item 5 where the modifying information includes an indication of a modulus of the circular buffer.

Item 7 includes the method of item 5 where the modifying information includes an indication of an offset value used in accessing the circular buffer.

Item 8 includes the method of item 1 where the first processor instruction when executed, performs a bit reverse incrementing operation, and the modifying information includes an indication of a mask value for the bit reverse incrementing operation.

Item 9 includes the method of item 1, where the executing a first instruction includes determining that an offset field of the first instruction indicates a first value, and the executing the first instruction includes accessing an extension portion of a source register of the at least one source register to obtain modifying information in response to the offset field indicating the first value, where if an offset field of a memory access instruction with update does not indicate the first value, producing an updated address operand for a memory access instruction with update will not include using modifying information from an extension portion of a source register for the memory access instruction with update.

Item 10 includes the method of item 1, where the extension portions of the plurality of registers are not used when executing scalar integer instructions.

Item 11 includes the method of item 1, where the extension portions of the plurality of registers are provided for storing SIMD vector elements.

Item 12 includes the method of item 1 where the first instruction is a SIMD instruction.

Item 13 includes the method of item 1, where an extension portion of the source register of the at least one source register includes a mode field and a control field; the modifying information is located in the control field; and the producing an updated address operand includes producing an updated address operand as per a plurality of updating techniques, where the mode field indicates which technique of the plurality is to be used in the producing.

Item 14 includes the method of item 1 and further includes executing a second instruction by the processor, where the second instruction is a memory access instruction with update, and where the execution of the second instruction includes accessing the main register portion of the first register to obtain the updated address operand, forming a second memory access address using the updated address operand, and using the second memory access address as an address for a second memory access.

Item 15 includes the method of item 1, where the forming the memory access address includes adding the first address operand with a first value to derive the memory access address, and the producing an updated address operand includes modifying the memory access address using the modifying information.

Item 16 includes a processor which includes a plurality of registers, each of the plurality of registers includes a main portion and an extension portion, where the main portion is N-bits and the extension portion is M-bits, where the processor is an N-bit processor; an execution unit, the execution unit for executing instructions, where registers of the plurality of registers are utilized as source registers and destination registers in the execution of instructions by the execution unit; and where the execution unit accesses at least one source register of the plurality of registers for executing a first memory access instruction with update, where the execution unit uses modifying data from an extension portion of a source register of the at least one source registers to update a first address operand from a main portion of a first source register of the at least one source registers to produce an updated address operand, where the updated address operand is written to the main portion of the first source register.

Item 17 includes the processor of item 16, where the execution unit uses modifying data from an extension portion of the first source register to update the first address operand.

Item 18 includes the processor of item 16, where the first memory access instruction is for accessing a memory operand stored in a circular buffer, and the modifying information includes an indication of buffer length of the circular buffer.

Item 19 includes the processor of item 16, where the first memory access instruction when executed, performs a bit reverse incrementing operation, and the modifying information includes an indication of a mask value for the bit reverse incrementing operation.

Item 20 includes the processor of item 16, where the extension portions of the plurality of registers are not used when executing scalar integer instructions by the execution unit, and the extension portions of the plurality of registers are provided for storing SIMD vector elements.

Item 20 includes the processor of item 16, where M equals N.

What is claimed is:

1. A method of operating a data processing system, comprising:
   executing a first instruction by an N-bit processor, wherein the first instruction is a memory access instruction with update, wherein the execution of the first instruction includes:
       accessing at least one source register of a plurality of registers, wherein the accessing the at least one source register includes accessing a first register of the plurality of registers, wherein each register of the plurality of registers includes a main register portion of N bits and an extension register portion of M bits, wherein the main register portion of the first register includes a first address operand, wherein each of N and M are a positive integer;
       forming a memory access address using the first address operand;
       using the memory access address as an address for a memory access;
       producing an updated address operand, wherein the updated address operand is based on the first address operand;
       writing the updated address operand to the main portion of the first register;
       wherein the producing includes accessing an extension portion of a source register of the at least one source register to obtain modifying information and using the modifying information in the producing an updated address operand.

2. The method of claim 1 wherein the accessing an extension portion of a source register of at least one source register to obtain modifying information includes accessing the extension register portion of the first register to obtain the modifying information.

3. The method of claim 2 wherein the first registers is a base register for the first instruction and the first address operand is a base address.

4. The method of claim 1 wherein:
   the at least one source register includes an index register of the plurality of registers, wherein the accessing an extension portion of a source register of at least one source register to obtain modifying information includes accessing the extension register portion of the index register to obtain the modifying information.

5. The method of claim 1 wherein:
   the first instruction is for accessing a memory operand stored in a circular buffer; and
   the modifying information includes an indication of buffer length of the circular buffer.

6. The method of claim 5 wherein the modifying information includes an indication of a modulus of the circular buffer.

7. The method of claim 5 wherein the modifying information includes an indication of an offset value used in accessing the circular buffer.

8. The method of claim 1 wherein:
   the first processor instruction when executed, performs a bit reverse incrementing operation;
   the modifying information includes an indication of a mask value for the bit reverse incrementing operation.

9. The method of claim 1 wherein:
   the executing a first instruction includes determining that an offset field of the first instruction indicates a first value;
   the executing the first instruction includes accessing an extension portion of a source register of the at least one source register to obtain modifying information in response to the offset field indicating the first value;
   wherein if an offset field of a memory access instruction with update does not indicate the first value, producing an updated address operand for a memory access instruction with update will not include using modifying information from an extension portion of a source register for the memory access instruction with update.

10. The method of claim 1 wherein the extension portions of the plurality of registers are not used when executing scalar integer instructions.

11. The method of claim 1 wherein the extension portions of the plurality of registers are provided for storing SIMD vector elements.

12. The method of claim 1 wherein the first instruction is a SIMD instruction.

13. The method of claim 1 wherein:
an extension portion of the source register of the at least one source register includes a mode field and a control field;
wherein the modifying information is located in the control field;
wherein the producing an updated address operand includes producing an updated address operand as per a plurality of updating techniques, wherein the mode field indicates which technique of the plurality is to be used in the producing.

14. The method of claim 1 further comprising:
executing a second instruction by the processor, wherein the second instruction is a memory access instruction with update, wherein the execution of the second instruction includes:
  accessing the main register portion of the first register to obtain the updated address operand;
  forming a second memory access address using the updated address operand;
  using the second memory access address as an address for a second memory access.

15. The method of claim 1 wherein:
the forming the memory access address includes adding the first address operand with a first value to derive the memory access address;
the producing an updated address operand includes modifying the memory access address using the modifying information.

16. A processor comprising:
a plurality of registers, each of the plurality of registers includes a main portion and an extension portion, wherein the main portion is N-bits and the extension portion is M-bits, wherein the processor is an N-bit processor, wherein each of N and M is a positive integer;
an execution unit, the execution unit for executing instructions, wherein registers of the plurality of registers are utilized as source registers and destination registers in the execution of instructions by the execution unit;
wherein the execution unit accesses at least one source register of the plurality of registers for executing a first memory access instruction with update, wherein the execution unit uses modifying data from an extension portion of a source register of the at least one source registers to update a first address operand from a main portion of a first source register of the at least one source registers to produce an updated address operand, wherein the updated address operand is written to the main portion of the first source register.

17. The processor of claim 16 wherein the execution unit uses modifying data from an extension portion of the first source register to update the first address operand.

18. The processor of claim 16 wherein:
the first memory access instruction is for accessing a memory operand stored in a circular buffer;
the modifying information includes an indication of buffer length of the circular buffer.

19. The processor of claim 16 wherein:
the first memory access instruction when executed, performs a bit reverse incrementing operation;
the modifying information includes an indication of a mask value for the bit reverse incrementing operation.

20. The processor of claim 16 wherein:
the extension portions of the plurality of registers are not used when executing scalar integer instructions by the execution unit;
the extension portions of the plurality of registers are provided for storing SIMD vector elements.

21. The processor of claim 16 wherein M equals N.

* * * * *